(12) United States Patent
Denda

(10) Patent No.: US 7,046,813 B1
(45) Date of Patent: May 16, 2006

(54) AUDITORY SENSE TRAINING METHOD AND SOUND PROCESSING METHOD FOR AUDITORY SENSE TRAINING

(76) Inventor: Fumio Denda, 2-5, Nishikigaoka, Kohoku-ku, Yokohama-shi, Kanagawa (JP)

( * ) Notice: Subject to any disclaimer, the term of this patent is extended or adjusted under 35 U.S.C. 154(b) by 0 days.

(21) Appl. No.: 09/159,104

(22) Filed: Sep. 23, 1998

(30) Foreign Application Priority Data

Sep. 25, 1997 (JP) .................... 9-259531

(51) Int. Cl.
*G09B 19/06* (2006.01)

(52) U.S. Cl. .................... 381/98; 434/185; 434/157

(58) Field of Classification Search .................... 381/1, 381/17; 434/156, 157, 185
See application file for complete search history.

(56) References Cited

U.S. PATENT DOCUMENTS

| | | | | |
|---|---|---|---|---|
| 3,828,446 A | * | 8/1974 | Mandel | 434/157 |
| 3,920,903 A | * | 11/1975 | Beller | 434/185 |
| 4,327,252 A | * | 4/1982 | Tomatis | 381/58 |
| 4,692,117 A | | 9/1987 | Goodwin | 434/185 |
| 4,802,228 A | * | 1/1989 | Silverstein et al. | 381/320 |
| 4,980,914 A | * | 12/1990 | Kunugi et al. | 381/1 |
| 5,119,420 A | * | 6/1992 | Kato et al. | 381/1 |
| 5,276,740 A | | 1/1994 | Inanaga et al. | 381/187 |
| 5,813,862 A | * | 9/1998 | Merzenich et al. | 434/185 |
| 5,895,220 A | * | 4/1999 | Beller et al. | 434/185 |
| 6,358,055 B1 | * | 3/2002 | Rothenberg | 434/185 |
| 6,500,006 B1 | * | 12/2002 | Wakamoto | 434/156 |

FOREIGN PATENT DOCUMENTS

| | | |
|---|---|---|
| EP | 0 707 433 A2 | 4/1996 |
| GB | 1 499 976 | 2/1978 |
| GB | 2 137 843 A | 10/1984 |
| JP | 63-030883 | 2/1988 |
| JP | 06-067596 | 3/1994 |
| WO | WO 96/18184 | 6/1996 |

* cited by examiner

*Primary Examiner*—Brian T. Pendleton
(74) *Attorney, Agent, or Firm*—Westerman, Hattori, Daniels & Adrian, LLP.

(57) ABSTRACT

An auditory sense training device 1 to be used in an auditory sense training method for training auditory sense by listening to a sound formed by processing an original sound comprises a band attenuation processing method 20 for attenuating a predetermined frequency band of an original sound 10, a switching means 30 for selectively outputting either the original sound or the output from said band attenuation processing means, a panpot processing means 40 for performing a panpot process wherein a voice signal formed by attenuating an original sound of one channel is superposed to the original sound of another channel, and a phase reverse processing means 50 for performing a phase reverse process of reversing the phase of the original sound, wherein a trainee listens to the original sound and a band attenuation processed sound formed by attenuating a predetermined frequency band of the original sound alternately.

4 Claims, 8 Drawing Sheets

AUDITORY SENSE TRAINING METHOD AND SOUND PROCESSING METHOD FOR AUDITORY SENSE TRAINING

BACKGROUND OF THE INVENTION

The present invention relates to an auditory sense training method and sound processing method for auditory sense training which realizes an effective training for the great improvement of auditory perception, which is an obstacle to a person grown in an environment having a different language practice from learning another language or music of a different language environment.

Further, the present invention relates to an auditory sense training method and sound processing method for auditory sense training which may be used in medical areas such as the treatment for hypacusia and tinnitus, or music treatment.

[Regarding Auditory Sense]

The auditory sense of a person does not have a structure common to everyone, but rather, the structure of the auditory sense could be characterized by the language the person is using in their daily life. In other words, the structure of a person's auditory sense is advanced so that it works conveniently when listening to the language they use in their daily life.

In this specification, the structure of an auditory sense refers to the structure including the recognition ability of a vowel or a consonant, or the recognition ability of the attenuation of a tone and the like.

It is very rare in the Japanese language to end a word or a sentence by a consonant including many high frequency components of above 200 Hz for example. Rather, it ends by attenuating a vowel including many low frequency components.

Further, according to studies, it is now known that the Japanese especially sensitively percepts a vowel in a voice, and as a very special phenomenon, the Japanese are very sensitive to the reverbaration included in a vowel (reverbaration is likely to remain when the frequency is low).

These characteristics on the frequency band of the Japanese language and the sensitiveness of the Japanese native to the reverberation sound or the attenuation sound show that the Japanese have a tendency to concentrate on the sound in the ending of a word.

That is, to a Japanese user, a peculiar or unique auditory sense structure which is appropriate for listening to and speaking Japanese is formed. Therefore, a voice which falls out of the peculiar auditory sense structure, for example, with a frequency component of above 2000 Hz, could not be recognized easily, and there is a tendency that the language having different pronunciation forms or grammar structure is hard to recognize.

Moreover, aging is another cause which makes it difficult for a person to recognize voice having high frequency regions.

On the other hand, in European languages such as English, German and Latin, high frequency components of over 2000 Hz are largely included, and some components even reach up to 6000 Hz.

That is, the language characteristics of an European language is opposite to Japanese in that the vowels only hold a dependent meaning, and that the recognition of the energy, the rising condition and the depth included in a consonant or the way to cut the consonant in the ending of a word is most important in recognizing the language. Moreover, the intonation, the strength, the accent and the like related to the grammar is important in recognizing the language. This could also be recognized from the fact that the native European language speakers are able to recognize the conversation of their language even by listening to voices whose frequency components of under 2000 Hz are reduced.

From the above mentioned fact, it could be seen that the Japanese have a tendency to recognize a vowel which does not exist, but on the other hand, may not recognize an existing consonant.

For example, the Japanese are known to have a low ability to recognize the rising of a consonant or to tell the high frequency components in a sound. One known example is that the Japanese have a low ability to tell the difference between the consonant of "L" and "R" or "M" and "N" in English.

Further, they recognize the word "McDonald" as "makudonarudo", and "Seven Eleven" as "sebun irebun", and pronounce such words by adding vowels.

That is, the above-mentioned words pronounced by the Japanese speaker is constituted according to the auditory sense structure of the Japanese language.

If the ability to recognize the rising of a consonant or to tell the high frequency components in a sound is low, the ability to pronounce the rising of a consonant or the high frequency components in a sound is also very low.

Therefore, according to the Japanese auditory sense structure mentioned above, it is difficult to either hear the language having a different language practice accurately or to pronounce such language as the native speakers.

In order to understand the structure of the auditory sense according to the Japanese language, the inventor performed an experiment where native Japanese speakers listened repeatedly to a voice processed to reduce its low frequency components and to strengthen a specific frequency band component, and came to the following conclusion.

Moreover, as a result of continuous experiment, a data was gained where the auditory sense would quickly switch back to the auditory structure as a Japanese native speaker when an unprocessed language is heard instead of the processed language.

Accordingly, it could be understood that in the auditory sense structure, the "recognition frequency" differs according to national, in other words, an "unrecognized frequency" exists according to national even if their tympanum may vibrate.

It is a problem yet to be solved in this unrecognized voice to find out what ability to recognize which frequency region is low and what training could there be to raise the ability to recognize those frequency region.

The characteristics of the language was mentioned above, but on the other hand, another unexpected fact was recognized by considering the characteristics regarding "conversation".

The conversation involves not only listening to the meaning of the contents of the speaker's words, but the listener also tries to decide his or her correspondence by constantly anticipating the words of the speaker from its contents. This anticipation is not only performed based on the meaning of the words itself, but also by the listener listening to the language and feeling the delicate nuance of the attitude, the tone, the flow of breath, the expression on the face of the speaker and the like, and to decide based on the impression from the speaker. This anticipation involves the experience, the knowledge, the insight and the like of the listener.

Therefore, conversation is performed by responding to the speaker through anticipation of the conversation based on the feelings received from the speaker, other than the meaning that the words hold. Such element of the conversation other than the pure language is considered to even exceed 60% of the whole information.

As mentioned above, the ability to try and recognize in their mind the frequency component included in a voice which is unique to the language (which is called "perception frequency" in the specification) varies according to each national. Such difference of the recognizable frequency band between the national is not caused by the difference in the structure of the auditory organ, but by the difference in the consciousness of the listener.

Since the listener lacks large elements other than language in a conversation and lacks the auditory sense formed by the language practice when having a conversation in a foreign language, there may be caused a difference in the understanding of the speaker and the listener caused by the difference of the language environment or the culture, which may lead to misunderstanding or even a panic.

Therefore, in order to accurately listen to a foreign language and to acquire the language, there is a need to break the auditory sense structure constituted from the practice or the anticipation of one's mother tongue. Therefore, an effective means for learning language is to process by some method the sound itself of the language to learn.

[Regarding Music]

On the other hand, music, like scat and singing, could be recognized as an objective element of a language, and holds a characteristic as a developed state of a language, which means that music may comprise more subjective impressions or imaginations than the language itself. Therefore, in order to practice foreign music, such as western music, it is expected to be effective to break the auditory sense structure formed by the environment of different language practice, and to stop the thinking based on the Japanese language.

[Regarding Conventional Training Methods]

In the training of acquiring hearing skills for a foreign language, most of the prior art methods utilized media such as CD or a face-to-face method where the trainee listens repeatedly to the pronunciation of a native speaker in order to lean a native pronunciation.

Moreover, a method for improving the effect is further proposed where the hearing training is performed by using media comprising images which directly appeal to the sense of sight of the trainee.

Further, accompanied by the development of personal computers, there is also provided computer softwares which could be used like games where the trainee decides on a story, and hits the keys on the computer following the spelling displayed on the monitor in order to learn foreign words.

Moreover, there are methods of training where an English word which is difficult to hear is played back in slow-motion as disclosed in Japanese Patent Publication No. S60-159776, a device for emphasizing the pronunciation comprising a frequency that is hard to hear from the trainee as disclosed in Japanese Utility-Model Publication No. 30003950, a device for activating the brain by outputting English to either one of the left or right channels and outputting music to the other channel as disclosed in Japanese Patent Laid-Open Publication No. H2-196272, or a method for either repeatedly outputting a frequency-processed English or by mixing English into music as disclosed in Japanese Patent Laid-Open Publication No. H6-67596.

Moreover, a device for taking out the difficult-to-hear frequency region and to amplify that tone so as to compensate for the lack of auditory capacity in an auditory sense handicapped person is disclosed in Japanese Patent Laid-Open Publication No. S48-98698.

On the other hand, there were many methods from old times to learn a language with the rhythm of a percussion instrument or other music.

As a new technology, there is a unique method being invented where the foreign language is learned generally by image training accompanied by figures, music or the movement of the body.

In present years, most of the method for learning language is performed by listening to a language spoken by a native speaker or foreign lecturer, combining a method to improve the learning effect by various ideas.

However, those ideas which may seem unique does not fall out of the basic leaning method of repeating and experiencing.

For example, in the method where the trainee listens to music or synthetic sound or pulse which have been frequency-processed so as to simplify the listening of foreign language, the trainee merely gets used to the high frequency wave temporarily, which is the same as feeling an afterimage when seeing light in the dark. As a result of investigation, such result is not permanent, and not very effective as a training method.

It is true that high frequency is included in the western language such as English, but according to the studies by the inventor, the auditory sense is not so simple as recognizing a foreign language by merely listening and getting used to high frequency.

That is because listening to high frequency and recognizing a sound holds absolutely different problems.

Further, as for the amplifying device for compensating the lack of auditory capacity of an auditory sense handicapped person, it is performed against a patient who lacks normal auditory sense, and is a device for merely selectively compensating the lacked frequency band.

The difference between the prior art methods and the present invention will become apparent from the motivation and the object of the present invention disclosed hereinafter.

The above-mentioned prior art merely strengthens the frequency component included in the voice portion which is difficult to catch in learning a foreign language, and to temporarily improve the listening skill. Therefore, the auditory sense of the trainee will return to its normal status when the trainee listens to his or her mother tongue. Since the effect by such prior art method is not permanent, the training will need a long period of time for repeated training.

It is known that it is very effective in the learning of language to change the perception frequency. Therefore, it is necessary for the trainee to break off the anticipation and the like when speaking the mother tongue or the practice in everyday life.

The ability to catch a foreign language is not only a problem of different frequency, but there is also a need to consider the following points.

1) The problem of aging where the high frequency region becomes hard to catch by aging.
2) The actual frequency band that the Japanese feel difficulty in catching, and the training method for catching that high frequency is still not known.
3) Language should be understood by catching more generally the rhythm, flow, intonation, timing and language practice difference between languages.

SUMMARY OF THE INVENTION

By the consideration on the above mentioned problems, the present invention aims at providing an auditory sense training method, a sound processing method for auditory sense training, auditory sense training device, and a recording media for auditory sense training which records the processed sound for auditory sense training, which greatly improves the effect of language learning by specifying the effective frequency band for changing the perception frequency and to break off the practice of the mother language and anticipation.

In order to solve the above-mentioned problem, the present invention provides an auditory sense training method for training auditory sense by listening to a sound made by processing an original sound, where a trainee listens to a region attenuation processed sound which is formed by attenuating a predetermined frequency region of said original sound.

Further, the present invention provides an auditory sense training method mentioned above where the trainee either listens continuously to the region attenuation processed sound which is formed by attenuating a predetermined frequency region against said original sound, or listens to said region attenuation processed sound and the original sound alternately, or listens to said region attenuation processed sound and an unacoustic (silence) portion alternately, or listens to said region attenuation processed sound, said original sound and said unacoustic sound alternately.

Moreover, the original sound to be heard alternately with the region attenuation processed sound may be an original sound which differs from the original sound being processed by the region attenuation process.

The present auditory sense training method sets the region for performing the attenuation process to the original sound in a region below a predetermined frequency in the range between 1800 Hz and 7000 Hz.

Further, the method sets the region for performing the attenuation process to the original sound in the region above a predetermined frequency in the range between 2000 Hz and 7000 Hz.

Moreover, the present invention sets the region for performing the attenuation process to the original sound in two regions; a region below a predetermined frequency between 1800 Hz and 7000 Hz, and a region over a predetermined frequency between 2000 Hz and 7000 Hz.

Even further, the auditory sense training method according to the present invention is performed by selecting one of the above plurality of region attenuation processes and performing the process to a plurality of frequencies. Further, the auditory sense training method according to the present invention is performed by combining two or more region attenuation processes mentioned above.

According to the auditory sense training method of the present invention, the region attenuation process is performed to a plurality of various frequencies, and the frequency and the process time is randomly set and arranged in time order.

In order to solve the above-mentioned problems, the present invention provides an auditory sense training method for training auditory sense by listening to a sound of more than two channels processing the original sound, wherein the trainee listens to a panpot processed sound performed of a process wherein an amplitude of the original sound of one channel is attenuated to form an amplitude attenuation processed sound which is outputted to one channel, and the amplitude attenuation processed sound formed by attenuating the amplitude of the original sound of one channel is superposed to the original sound of the other channel and outputted to the other channel (this process hereinafter called a panpot process) and a sound which has not been performed of said panpot process alternately.

According to the present invention regarding an auditory sense training method performing the above-mentioned panpot process, said panpot process is performed so that the sum of the amplitude attenuation processed sound outputted to one channel and the amplitude attenuation processed sound outputted to the other channel is fixed for one channel signal.

According to the present invention regarding an auditory sense training method performing said panpot process, the panpot process is performed by a plurality of various process patterns, wherein the process pattern and the process time is set randomly and the panpot process is arranged in time order.

In order to solve the above-mentioned problem, the present invention provides an auditory sense training method for training auditory sense by listening to a sound processing an original sound, wherein a trainee listens to a phase reverse processed sound performed of a phase reverse process to the original sound and the original sound alternately.

According to the present invention regarding an auditory sense training method using said phase reverse process, said phase reverse process sets the processing time randomly and the process is arranged in time order.

In order to solve the above-mentioned problem, the present invention regarding an auditory sense training method combines said region attenuation process and said panpot process.

Moreover, the auditory sense training method of the present invention combines said region attenuation process and said phase reverse process.

Further, the auditory sense training method of the present invention combines said panpot process and said phase reverse process.

Moreover, the prevent invention combines said region attenuation process, said panpot process and said phase reverse process.

The auditory sense training method of the present invention defines said original sound to one of the following; either natural sound or artificial sound, either voice or non-voice, or either tone or noise.

The auditory sense training method of the present invention defines said original sound to two or more of either natural sound or artificial sound, either voice or non-voice, or either tone or noise.

Natural sound includes all sound except for the sound generated artificially. Voice includes all the voice generated by a human, and non-voice includes all sounds except voice. Tone includes every sound except noise, and noise includes all sound other than tone.

The auditory sense training method of the present invention is used for training language hearing skills by making a trainee listen to a sound generated by combining a processed sound to a language.

The auditory sense training method of the present invention mentioned above is performed by making a trainee listen to the region attenuation processed sound attenuating a predetermined frequency region against an original sound as the background of a language.

The region attenuation processed sound could either be language or any sound other than language.

The auditory sense training method for language training according to the present invention mentioned above outputs said region attenuation processed sound continuously by a small amplitude as the background of a language.

Further, the auditory training method for language training according to the present invention outputs said region attenuation processed sound discontinuously as the background of a language.

The auditory sense training method for language training according to the present invention sets high band attenuation processed sound by attenuating the region over a specific frequency of above 2000 Hz.

Moreover, the auditory sense training method for language training according to the present invention sets the region attenuation processed sound as a combination of a low band attenuation processed sound where a region of below a specific frequency in the range between 1800 Hz and 7000 Hz is attenuated and a high band attenuation processed sound where a region of over a specific region of over 2000 Hz is attenuated.

The auditory sense training method for language training according to the present invention performs said region attenuation process to a plurality of various frequencies, sets said frequency and the process time randomly, and arranges the process according to time.

The auditory sense training method utilizing said region attenuation processed sound gained by performing the region attenuation process to the original sound performs a process to amplify the amplitude of the processed sound being attenuated by the region attenuation process.

The amplification of the amplitude may be in the level to return the amplitude being attenuated by the region attenuation process to the original level, or the amplitude may either be amplified to an amplitude exceeding the original amplitude, or may be amplified below the original amplitude.

In order to solve the above-mentioned problems, a sound processing method for auditory sense training for use in an auditory sense training method for training auditory sense by listening to a sound generated by processing an original sound according to the present invention performs a region attenuation process for attenuating a desired frequency region of the original sound.

The sound processing method for auditory sense training according to the present invention sets the region for performing the attenuation process of the original sound to a region below a predetermined frequency in the range between 1800 Hz and 7000 Hz.

Further, the sound processing method for auditory sense training according to the present invention sets the region for performing the attenuation process of the original sound to a region above a predetermined frequency in the range between 2000 Hz and 7000 Hz.

Even further, the sound processing method for auditory sense training according to the present invention sets the region for performing the attenuation process against the original sound to two regions, a region below a predetermined frequency in the range between 1800 Hz and 7000 Hz, and a region above a predetermined frequency in the range between 2000 Hz and 7000 Hz.

Further, the sound processing method for auditory sense training according to the present invention sets the region for performing the attenuation process of the original sound to a combination of two regions, a region below a predetermined frequency in the range between 1800 Hz and 7000 Hz, and a region above a predetermined frequency in the range between 2000 Hz and 7000 Hz.

Further, the sound processing method for auditory sense training according to the present invention sets the region for performing the attenuation process of the original sound to a region below a predetermined frequency in the range between 1800 Hz and 7000 Hz, and a combination of two regions; a region below a predetermined frequency in the range between 1800 Hz and 7000 Hz, and a region above a predetermined frequency in the range between 2000 Hz and 7000 Hz.

Further, the sound processing method for auditory sense training according to the present invention sets the region for performing the attenuation process of the original sound to a region above a predetermined frequency in the range between 2000 Hz and 7000 Hz, and a combination of a region below a predetermined frequency in the range between 1800 Hz and 7000 Hz and a region above a predetermined frequency between 2000 Hz and 7000 Hz.

Further, the sound processing method for auditory sense training according to the present invention sets the region for performing the attenuation process of the original sound to a region below a predetermined frequency in the range between 1800 Hz and 7000 Hz, a region above a predetermined frequency in the range between 2000 Hz and 7000 Hz, and a combination of two regions of a region below a predetermined frequency in the range between 1800 Hz and 7000 Hz and the region above a predetermined frequency in the range between 2000 Hz and 7000 Hz.

According to the sound processing method for auditory sense training mentioned above, the region attenuation process is performed targeting a plurality of various frequencies, and said frequencies and the processing time is set randomly and arranged in time order.

In order to solve the above-mentioned problems, the present invention provides a sound processing method for auditory sense training to be utilized in an auditory sense training method by listening to a sound of more than two channels formed by processing an original sound, wherein a panpot process is performed where an amplitude attenuation processed sound formed by attenuating the amplitude of an original sound of one channel is outputted to one channel, and an amplitude attenuation processed sound formed by attenuating the amplitude of an original sound of one channel is superposed to the original sound of the other channel and outputted to the other channel.

Such panpot process could be performed independently to each channel.

According to the sound processing method for auditory sense training of the present invention, the panpot processed sound which is formed by panpot processing a sound is outputted alternately with a sound which has not been performed of said panpot process.

According to the sound processing method for auditory sense training of the present invention, said panpot process is performed so that the sum of the amplitude attenuation processed sound outputted to one channel and the amplitude attenuation processed sound outputted to the other channel is fixed for a channel signal.

According to the sound processing method for auditory sense training of the present invention, the panpot process is performed by a plurality of various processing patterns, said processing pattern and the processing time set randomly and arranged in time order.

Moreover, in order to solve the above mentioned problems, the present invention provides a sound processing method for auditory sense training so as to train the auditory sense by listening to a sound formed by processing an original sound, wherein a phase reverse process is performed to the original sound for reversing the phase of the original sound.

According to the present invention regarding a sound processing method for auditory sense training performing said phase reverse process, said phase reverse process sets the processing time randomly.

In order to solve the above-mentioned problem, the present invention regarding a sound processing method for auditory sense training combines said region attenuation processing method and said panpot processing method.

Moreover, the sound processing method for auditory sense training of the present invention combines said region attenuation processing method and said phase reverse processing method.

Further, the sound processing method for auditory sense training of the present invention combines said panpot processing method and said phase reverse processing method.

Moreover, the sound processing method for auditory sense training combines said region attenuation processing method, said panpot processing method and said phase reverse processing method.

The sound processing method for auditory sense training of the present invention defines said original sound to one of the following; either natural sound or artificial sound, voice or non-voice, or tone or noise.

Natural sound includes all sound except sound generated artificially. Voice includes all the voice generated by a human, and non-voice includes all sounds except voice. Tone includes every sound except for noise, and noise includes all sound other than tone.

According to the sound processing method for auditory sense training of the present invention, the original sound combines natural sound or artificial sound, voice or non-voice, or tone or noise.

In order to solve the above-mentioned problems, the sound processing method for auditory sense training of the present invention is used for the training of language hearing skills by combining a processed sound to voice.

In order to solve the above-mentioned problems, an auditory sense training device to be used for an auditory sense training method for training the auditory sense by listening to a sound formed by processing an original sound, comprises a band attenuation means for attenuating a predetermined frequency region of an original sound, and a switching means for selectively outputting the output of said band attenuation means and said original sound.

The auditory sense training device of the present invention comprises a band attenuation means comprising a plurality of band attenuation means and a selecting means for selectively outputting the output from said band attenuation means.

According to the auditory sense training device of the present invention, the band attenuation means comprises a low band attenuation means for attenuating the region below a predetermined frequency in the range between 1800 Hz and 7000 Hz.

According to the auditory sense training device of the present invention; the band attenuation means comprises a high band attenuation means for attenuating the region above a predetermined frequency in the range between 2000 Hz and 7000 Hz.

According to the auditory sense training device of the present invention, the band attenuation means comprises two region attenuation means for attenuating two regions; a region below a predetermined frequency in the range between 1800 Hz and 7000 Hz, and a region above a predetermined frequency in the range between 2000 Hz and 7000 Hz.

According to the auditory sense training device of the present invention, the band attenuation means comprises a combination of a low band attenuation means for attenuating a region below a predetermined frequency in the range between 1800 Hz and 7000 Hz, and a high band attenuation means for attenuating a region above a predetermined frequency in the range between 2000 Hz and 7000 Hz.

According to the auditory sense training device of the present invention, the band attenuation means comprises a combination of a low band attenuation means for attenuating a region below a predetermined frequency in the range between 1800 Hz and 7000 Hz, and a two region attenuation means for attenuating two regions; a region below a predetermined frequency in the range between 1800 Hz and 7000 Hz and a region above a predetermined frequency in the range between 2000 Hz and 7000 Hz.

According to the auditory sense training device of the present invention, the band attenuation means comprises a combination of a low band attenuation means for attenuating a region below a predetermined frequency in the range between 1800 Hz and 7000 Hz, a high band attenuation means for attenuating a region above a predetermined frequency in the range between 2000 Hz and 7000 Hz, and a two region attenuation means for attenuating two regions; a region below a predetermined frequency in the range between 1800 Hz and 7000 Hz and a region above a predetermined frequency in the range between 2000 Hz and 7000 Hz.

According to the auditory sense training device of the present invention, the band attenuation means sets a plurality of various frequencies and processing time randomly.

In order to solve the above-mentioned problems, the present invention provides an auditory sense training device to be used in an auditory sense training method by listening to a sound of more than two channels formed by processing an original sound, wherein a panpot processing means is equipped for outputting an amplitude attenuation processed sound formed by attenuating the amplitude of an original sound of one channel to one channel, and for outputting to the other channel an amplitude attenuation processed sound formed by attenuating the amplitude of an original sound of one channel which is superposed to the original sound of the other channel.

Such panpot process could be performed independently to each channel.

According to the auditory sense training device of the present invention, said panpot processing means is formed of more than four variable attenuation means and more than two adding means, said each variable attenuation means formed as a variable means controlled of its attenuation quantity by an attenuation coefficient, and inputting to said each adding means an output from said variable attenuation means of one channel and an output of another variable attenuation means.

According to the auditory sense training device of the present invention, said panpot processing means is formed so that the sum of the amplitude attenuation signal outputted to one channel and the amplitude attenuation signal outputted to the other channel is fixed for a channel signal.

According to the auditory sense training device of the present invention, the panpot processing method is performed by a plurality of various processing patterns, and said processing patterns and the processing time are set randomly.

Moreover, in order to solve the above mentioned problems, the present invention provides an auditory sense training device to be used for auditory sense training method for training the auditory sense by listening to a sound formed by processing an original sound, wherein a phase reverse processing means is further equipped for reversing the phase of the original sound by a predetermined pattern.

According to the auditory sense training device of the present invention, the phase reverse processing means comprises of a phase reverse means for reversing the phase of an original sound by a predetermined pattern, and a selecting means for selectively outputting an output of said phase reverse means and the original sound based on a phase reverse control signal.

In order to solve the above-mentioned problems, the present invention provides an auditory sense training device comprising a band attenuation means for attenuating a predetermined frequency region of an original sound, and a switching means for selectively outputting the output of said band attenuation means and said original sound.

The present invention provides an auditory sense training device to be used in an auditory sense training method for training auditory sense by listening to a sound formed by processing an original sound, the device being equipped with a panpot processing means for superposing a voice signal formed by applying an amplitude attenuation process to an original sound of one channel to the original sound of another channel.

The present invention provides an auditory sense training device equipped with a phase reverse processing means for reversing the phase of an original sound by a predetermined pattern.

The present invention provides an auditory sense training device comprising a band attenuation means for attenuating a predetermined frequency region of the original sound, a switching means for selectively outputting the output of said band attenuation means and said original sound, and a panpot processing means for superposing a voice signal formed by providing an amplitude attenuation process to the original sound of one channel to the original sound of another channel.

The present invention provides an auditory sense training device comprising a panpot processing means for superposing a voice signal formed by providing an amplitude attenuation process to the original sound of one channel to the original sound of another channel, and a phase reverse processing means for reversing the phase of the original sound by a predetermined pattern.

The present invention provides an auditory sense training device comprising a band attenuation means for attenuating a predetermined frequency region of the original sound, a switching means for selectively outputting the output of said band attenuation means or the original sound, a panpot processing means for superposing a voice signal formed by providing an amplitude attenuation process to the original sound of one channel to the original sound of another channel, and a phase reverse processing means for reversing the phase of the original sound by a predetermined pattern.

In order to solve the above-mentioned problems, a recording medium for auditory sense training according to the present invention records a processed sound formed by processing a sound according to the above-mentioned sound processing method for auditory sense training.

The recording medium of the present invention is either a compact disk (CD), a magneto-optical disk (MO), magnetic recording medium such as floppy disk and magnetic tape, or semiconductor memory such as semiconductor RAM and semiconductor ROM.

PREFERRED EMBODIMENT OF THE INVENTION

Figure 1:
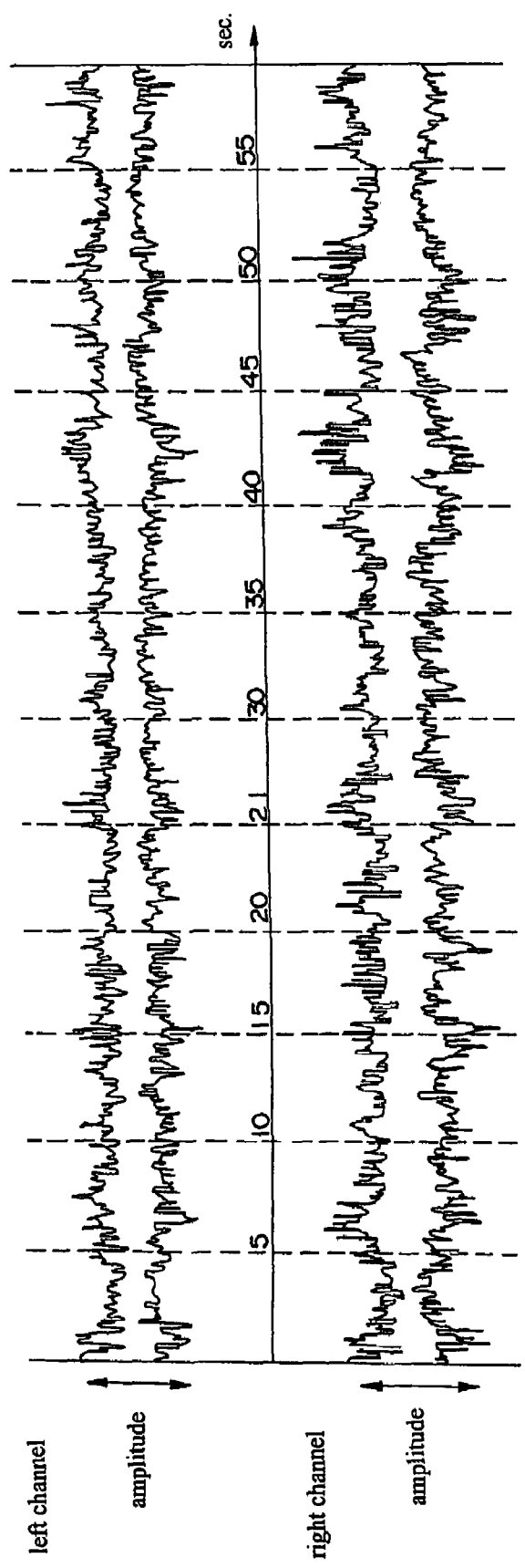
FIG. 1 shows the waveform of the original sound to which the panpot process is performed in the present invention.

The embodiment of the present invention will now be explained. The present embodiment relates to an auditory sense training method so as to release a trainee from the practice of strengthening the vowel when listening to music or foreign language which is a characteristic of the mother tongue, by making a trainee listen to a voice whose sound source is treated with a specific process.

In the present specification, sound is defined as any sound such as a natural sound or an artificial sound, voice or non-voice, or tone or noise.

Natural sound includes all sound except sound generated artificially. Voice includes all voice generated by human, and non-voice includes all sound except voice. Tone includes all sound except noise, and noise includes all sound except tone.

Moreover, an original sound refers to a sound which has not been performed of the process according to the present invention, and a processed sound refers to a sound which has been performed of the process according to the present invention.

When superposing a plurality of processes, the processed sound being performed of the former process is called the original sound in the latter process.

Moreover, sound source refers to a supply source of the original sound, for which a CD (compact disk) could mainly be used, and the contents of the sound source could be any of the following; music, natural sound, sampling sound, synthetic sound, sound reducing an electric wave to an audible tone region, pulse tone, spoken language from a CD for language learning and the like.

When the object of the audible sense training is set, the audible sense training could be performed by playing a recording medium which has been recorded of the processed sound performed of the process according to the present invention, wherein the recording medium could be any of the following; CD, MD, magnetic recording medium such as a floppy disk or a magnetic tape, a semiconductor memory such as a semiconductor RAM or a semiconductor ROM, and the like.

The present invention is constituted by combining a plurality of basic process patterns.

(1) A pattern for performing a process wherein an amplitude attenuated sound formed by attenuating the amplitude of an original sound of one channel is outputted to one channel, and the amplitude attenuation sound formed by attenuating the amplitude of the original sound of one channel is superposed to the original sound of another channel and outputted to the other channel.

This process is called a panpot process in the present specification, and the sound treated by the panpot process is called a panpot processed sound.

(2) A pattern for performing the process of attenuating a specific frequency region of an original sound by passing the original sound to a filter and the like.

This process is called a region attenuation process in the present specification, and the sound performed of the region attenuation process is called a region attenuation processed sound.

(3) A pattern for performing the process of reversing the phase of the original sound on either the left or the right channel.

This process is called a phase reverse process in the present specification, and the sound performed of the phase reverse process is called a phase reverse processed sound.

In the present specification, the phase reverse process is not restricted to reversing the phase for 180 degrees, but also includes shifting the phase of the original sound for roughly 180 degrees.

(4) A pattern which optionally combines the processes disclosed in (1) through (3).

When the auditory sense training is aimed at language learning, the processed sound treated of the above-mentioned processes is used as the background of the conversation, and when it is aimed at training auditory sense of music, the processed sound itself is listened to.

The consent of the panpot process is now explained by taking an example of the panpot process being performed to the sound source of the right channel.

The panpot process is a process for superposing one portion of the sound source of each of the left and right channels to the sound source of the other channel and outputting the same.

When the panpot processing quantity of the right channel is 0%, the original sound on the right channel itself is outputted only from the right channel, and the original sound on the right channel will not be outputted from the left channel.

When the panpot processing quantity of the right channel is 50%, the processed sound formed by attenuating 50% of the original sound is outputted to the right channel, and the processed sound formed by attenuating 50% of the original sound of the right channel is outputted to the left channel. In this case, the original sound on the right channel should be heard as a monaural sound at the center of both left and right channels.

When the panpot processing quantity of the right channel is 75%, the processed sound attenuating 75% of the original sound is outputted to the right channel, and on the left channel, an output of the volume of 75% of the original sound on the right channel, that is, the processed sound attenuating 25% of the original sound on the right channel is outputted. At this time, the original sound on the right channel should be heard so that is moved from the center of the left and right channels toward the left channel side.

When the panpot processing quantity of the right channel is 100%, the sound attenuating 100% of the original sound is outputted to the right channel. That is, the original sound of the right channel will not be outputted to the right channel, and the original sound of the right channel will be outputted to the left channel without any attenuation. At this time, the original sound on the right channel is heard to have moved to the left channel.

The example of such panpot process is explained with reference to FIGS. 1 and 2.

Figure 2:
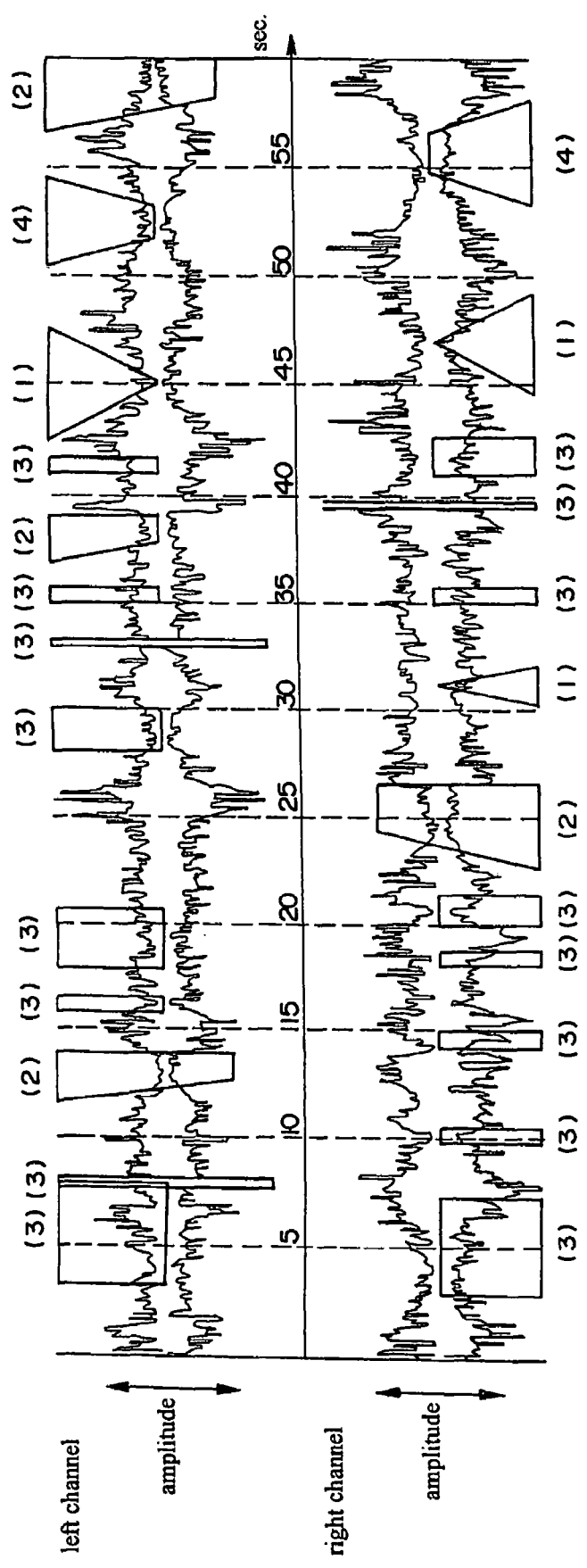
FIG. 2 shows the waveform of the panpot processed sound according to the present invention.

FIG. 1 is a drawing showing the amplitude waveform of the original sound before the panpot process, wherein the time axis is taken as the horizontal axis, and the amplitude is taken as the vertical axis. FIG. 2 shows the amplitude waveform after the panpot process, wherein the time axis is taken as the horizontal axis, and the amplitude is taken as the vertical axis. In FIG. 2, the region surrounded by the solid line is the region where the panpot process has been performed, wherein the extension to the upper and lower directions show the panpot processing quantity, and the extension to the left and right directions show the panpot processing time.

As shown in the drawing, the panpot process is performed individually to each of the left and right channels, and each processed sound provides an influence to the other channel. Moreover, by providing the panpot process, the output on one channel is attenuated, and the output on the other channel is increased.

There are following patterns to the panpot process forms.

The first process pattern is called a "chevron", wherein the panpot processing quantity (panpot quantity) is increased by a fixed ratio from the start, and when it reaches a predetermined value, the quantity is decreased by a fixed ratio. This form is shown by (1) of the drawing. The time for changing the panpot quantity from the original value to the fixed value, or from the fixed value to the original value, is 5 seconds at maximum, and the processing time is preferably more than 0.1 seconds at minimum, and up to 10 seconds at maximum. The processing number of times should preferably be in the range from 1 to 45 times per one minute as a total of both channels.

The second process pattern is a form called "trapezoid vertical shape", wherein the panpot quantity is increased by a fixed speed, and then maintained at a predetermined value for a fixed time, and then returned immediately back to the original value. This form is shown by (2) of the drawing. The time for changing the panpot quantity from the original value to the fixed value is 5 seconds at maximum, and the fixed maintaining time is preferably approximately 0.1 seconds at minimum, and 15 seconds at maximum.

The third process pattern is a form called "right angle shape", wherein the panpot quantity is changed immediately to a fixed value, maintained at the predetermined value for a fixed time, and then returned immediately back to the original value. This form is shown by (3) in the drawing. The processing time is preferably approximately 0.1 seconds at minimum, and 15 seconds at maximum.

The fourth process pattern is a form called "trapezoid symmetry shape", wherein the panpot quantity is increased by a fixed speed, maintained at the predetermined value for a fixed time, and then returned back to the original value by reducing the panpot quantity with a fixed speed. The processing time for varying the panpot quantity from the original value to the fixed value, or from the fixed value to the original value is approximately 5 seconds at maximum, and the fixed maintaining time is preferably 0.1 seconds at minimum and 15 seconds at maximum.

According to any of the above-mentioned processing patterns, the minimum value of the panpot quantity is 50% and the maximum value is 100%, but since the sound performed of a process with the panpot quantity of 100% may sound odd, it is preferred not to use it frequently. In contrast, the effect of the auditory sense improvement will be reduced when the panpot quantity falls below 50%.

According to the above-mentioned panpot processes, regardless of the type of process patterns, sufficient effect may not be gained if the time from the start of the process to the maximum value exceeds 3 seconds. Similarly, if the time taken from the maximum value of the process to return to the original value exceeds 3 seconds, the effect gained would not be sufficient.

In order to provide a maximum effect by the processes, it is effective not to add a process with a gradually rising value or a process with a gradually returning value (for example, the chevron or the trapezoid type process), but the frequent use of rapid process may cause symptoms of dizziness or the like. Therefore, by mixing the above-mentioned processes to some portions, the rapid processes could be used more effectively.

Figure 3:
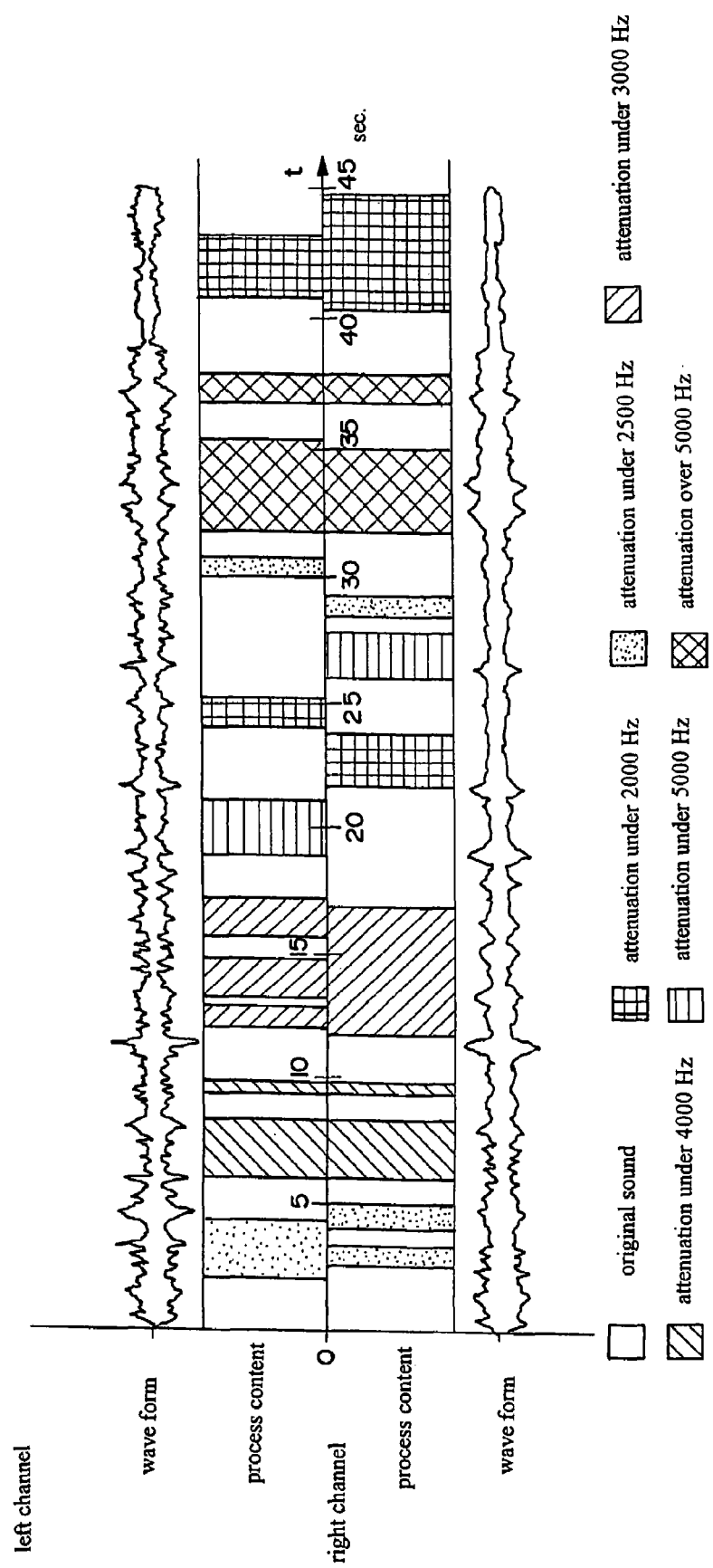
FIG. 3 is an explanatory view showing the contents of the region attenuation process according to the present invention.

The example of the region attenuation processing pattern will now be explained with reference to FIG. 3.

In the drawing, the horizontal axis shows time, and the waveforms extending horizontally in the upper and lower directions of the drawing show the type of waveforms of the sound source, and the upper and lower areas from the center line show the contents of the region attenuation process.

According to the contents of the region process in the present example, a non-processing where the original sound is not processed, a process for attenuating each region of below either 2000 Hz, 2500 Hz, 3000 Hz, 4000 Hz, or 5000 Hz of the original sound, or a process for attenuating the region over 5000 Hz of the original sound is performed randomly.

As shown in the drawing, in the left channel, a specific frequency region is attenuated by a random continuation time as in the following example; a little over 2 seconds of non-processing, a little over 2 seconds of attenuation below 2500 Hz, 1.5 seconds of non-processing, a little over 2 seconds of attenuation below 4000 Hz, 1 second of non-processing, 0.5 seconds of attenuation under 4000 Hz, 2 seconds of non-processing, 1 second of attenuation below 3000 Hz, and so on.

Similarly, in the right channel, a specific frequency region is attenuated by a random continuation time as in the following example; 2.5 seconds of non-processing, a little under 1 second of attenuation below 2500 Hz, a little over 0.5 seconds of non-processing, 1 second of attenuation below 2500 Hz, a little over 0.5 seconds of non-processing, 2 seconds of attenuation below 4000 Hz, 1 second of non-processing, 1.5 seconds of attenuation below 4000 Hz, a little under 2 seconds of non-processing, a little over 5 seconds of attenuation under 3000 Hz, and so on.

Such region attenuation process should preferably be approximately 0.1 seconds at minimum and 7 seconds at maximum, and the number of region attenuation process to be performed by both channels as total should preferably be in the range between 1 to 60 times.

In the example of the region attenuation process disclosed above a process of either attenuating a region below a specific frequency or attenuating a region above a specific frequency was performed. However, a process of attenuating a specific frequency region of between a specific frequency and to leave the other frequency regions, or a process of attenuating the upper and lower frequency regions to leave only the central frequency regions may also be performed.

Moreover, since the region attenuation processed sound having been performed of the above-mentioned process has a reduced amplitude, it is preferable that an amplifying process would be performed thereto so as to return the amplitude back to the original value.

Further, the process was discontinuous in the above-mentioned region attenuation example, but the region attenuation process could be performed continuously of a predetermined frequency, or the region attenuation process could also be performed by continuously varying the frequency.

By carrying out such processes, either the low frequency components would be reduced or the high frequency components would be strengthened randomly, which is considered to work so as to reduce the effect or the anticipation of strengthening the vowel or hearing the reverberation.

The phase reverse process is explained hereinafter. The phase reverse process is a process to reverse the phase of an original sound on either the left or the right channel for a predetermined period of time, and to provide a stimulation to the auditory sense.

The phase reverse process could be performed to either the left or the right channel, since from the auditory sense point of view, the phase reverse performed to the right channel and the phase reverse performed to the left channel seems similar, though it may involve technical differences.

The minimum time for performing the phase reverse process is 0.1 seconds and the maximum is 10 seconds. The number of phase reverse process to be performed is preferably once at minimum, and 600 times at maximum for the total of both channels per minute. Both the timing and the time for performing the phase reverse process could be set randomly.

Similar to the panpot process or the high region attenuation process, the phase reverse process is used for auditory sense training after performing the low region attenuation process. The low region attenuation processing method is similar to the panpot process or the high region attenuation process.

The phase reverse process could either be used independently, or combined with the panpot process or the high region attenuation process.

According to the training method of the present invention, a various process forms could be gained by combining a simple process disclosed in (1), (2) and (3).

[Working Example]

The actual example of the combination of the region attenuation process and the panpot process will be explained below.

In this example, the frequency for performing the region attenuation process (process frequency) is set to the range between 1800 Hz and 7000 Hz, and the region below a process frequency is attenuated by targeting a frequency separated by more than 500 Hz from the processing frequency positioned in the peripheral areas.

The process for performing the attenuation process against a frequency region under the process frequency is called "low band attenuation process" in the present specification.

This low band attenuation process is performed so that the attenuation is performed to −6 dB to −10 dB for the frequency of approximately 65% in each process frequency, and −20 dB for the frequency below 65% against the original sound. For example, when the process frequency is 2000 Hz, attenuation is performed by setting the value to −10 dB from 2000 Hz to 1300 Hz (which is 65% of 2000 Hz), and setting the value to below −20 dB under 1300 Hz.

The minimum time for processing the low band attenuation process is 0.1 seconds, and the maximum time is approximately 7 seconds in order to gain effective results.

The low band attenuation process should preferably be performed once at minimum, and 60 times at maximum as total of the left and right channels.

The low band attenuation process could also be performed in steps where a plurality of low band attenuation processes against a various frequency region mentioned above are superposed.

That is, when superposing the low band attenuation processes of 2000 Hz and 2500 Hz in steps, the frequency over 2500 Hz is non-processed, the range between 2000 Hz and 2500 Hz is performed of an attenuation process of −10 dB, the range between 1625 Hz and 2000 Hz of −20 dB, the range between 1300 Hz to 1625 Hz of −30 dB, and the range below 1300 Hz of −40 dB.

Such step-like superposing process would have a meaning as an auditory sense training since it attenuates a low frequency region, but it is effective in maintaining this training, which is separate from auditory training effects, in that the low frequency regions should be somewhat left so as to provide an easy-to-listen processed sound. Therefore, the attenuation quantity should not exceed approximately −30 dB.

Such superposed process against various frequencies should be performed so that the processing time of each process frequency should not be superposed above 50% in a single time band.

On the other hand, a process for attenuating the region above a predetermined process frequency in the range between 2000 Hz and 7000 Hz exists. This process is called "high band attenuation process". By interposing a high band attenuation process bettween low band attenuation processes, the effect of the auditory sense training could be improved.

Unlike the low band attenuation process, the high band attenuation process requires a large attenuation directly from the process frequency, and the attenuation could be larger than −10 db, and preferably larger than −20 dB.

When interposing the high band frequency process, the number of the process should be twice to 50 times as a total of both channels per minute.

Moreover, there is a process for superposing two processes; a process for attenuating the region lower than the process frequency in the range between 1800 Hz and 7000 Hz, and a process for attenuating the region above the frequency in the range between 2000 Hz and 7000 Hz. This process is called "two region attenuation process". The two region attenuation process could be interposed between the high band attenuation process or the low band attenuation process so as to further improve the effect of the auditory sense training.

Next, in the practice example, a panpot process is performed against a processed sound which has been performed of the low band attenuation process.

After performing the panpot process, the high band attenuation process is performed.

The high band attenuation process is performed in the range between 2000 Hz and 7000 Hz, which is separated by more than 500 Hz from the approximate process frequency.

The low band attenuation process, the panpot process, the high band attenuation process, or the phase reverse process in such combined process should be performed for a total in the left and right channels of approximately over 4 times and at a maximum of 60 times per minute.

The application of the present invention to language learning or language hearing training is explained below.

This application utilizes the processed sound according to the present invention as a background when learning the language.

There are two ways in using the processed sound for improving the listening skills to the pronunciation of a native speaker or to perform listening training.

The first method is to perform the auditory sense training by making the trainee listen to the processed sound having been performed of the above-mentioned processes which does not include the voice of the native speaker.

The second method is to learn a language by making the trainee listen to a sound where a processed sound having been treated of the above-mentioned processes is superposed as background to the pronunciation of the native speaker.

Any sound from a natural sound or an artificial sound, voice or non-voice, or tone or noise could be used as the sound source to be used as the background, and the sounds could be used either independently or by an optional combination.

The original sound to be used as background could either be treated by one of the above-mentioned processes; the low band attenuation process, the panpot process or the phase reverse process, or a combination of these processes.

The feature of the process to be performed to the background in language learning is that the effect of the training could be improved by using the sound performed of only the low band attenuation process as the sound source. Especially, as the low band attenuation process in language learning, the region attenuation process should preferably be performed against the frequency in the range between 1800 Hz and 6000 Hz, and used as the background continuously.

In the process for the background, the easiness to hear the language is different for each person depending on the variety of the process, but a lasting effect of the training could be gained in the following order: (1) discontinuous low band attenuation process; (2) combination of discontinuous low band attenuation process and panpot process; (3) combination of discontinuous low band attenuation process, panpot process and phase reverse process; (4) combination of discontinuous high band attenuation process, panpot process and phase reverse process; (5) continuous low band attenuation process; (6) combination of continuous low band attenuation process and panpot process; (7) combination of continuous low band attenuation process, panpot process and phase reverse process; and (8) a mixture of the various processes.

In the present method, a non-processed original sound which has not been treated of any of the above-mentioned processes is used as the voice of the native speaker. Moreover, in the present method, various processed sounds performed of the above-mentioned processes are used as the background. Even further, in the present invention, the original sound of the speaker's voice and the sound combining said various processed sounds are used for auditory sense training and language learning.

It is effective to mix the sounds by attenuating the processed sound to be used as the background to a range between −8 dB and −20 dB compared to the volume of the language.

The effective range of the low band attenuation process is approximately between 2000 Hz and 6000 Hz, but as a more effective frequency, the effective process frequency for a female voice is around 4000 Hz, and for a male voice, around 3000 Hz. However, this frequency depends greatly to the quality of the speaker's voice, so it is difficult to fix a specific value.

According to this method, the pronunciation of the native speaker could be heard in the most natural state.

The processed sound used as the background could be gained by the method processing the original sound and outputting the same, or gained by recording the processed sound formed by processing the original sound to a recording mediums such as CD or magnetic tape, and playing the recording medium.

Moreover, a sound superposing the processed sound formed by processing the original sound and the voice of the native speaker could be recorded to a recording medium such as CD or magnetic tape, and such medium could be played for use in language learning.

Next, an auditory training device for realizing the above-mentioned auditory sense training method is explained.

Figure 4:
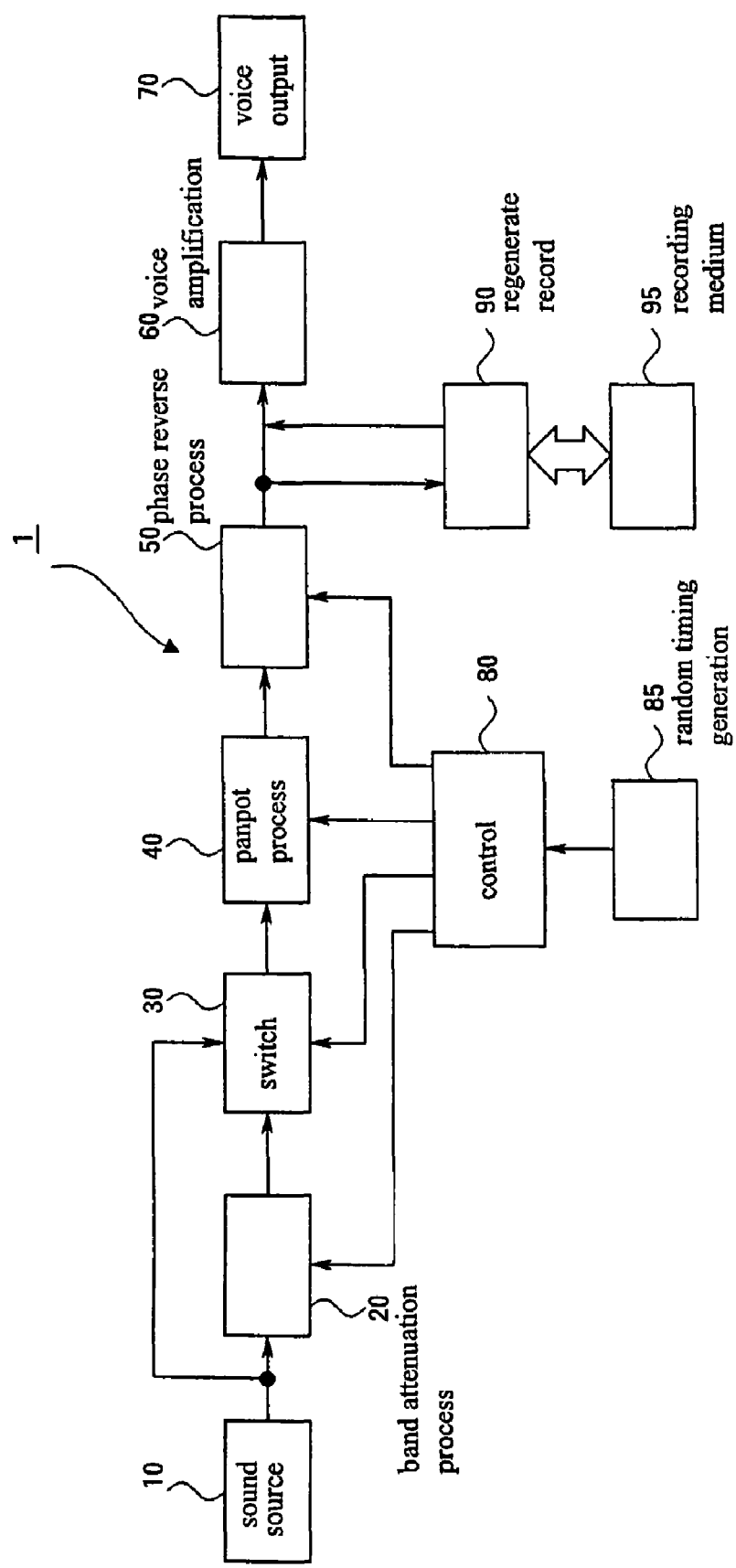
FIG. 4 is a block diagram showing the structure of the auditory sense training device according to the present invention.

FIG. 4 shows a circuit block diagram showing the outline of the structure of the auditory sense training device according to the present invention.

The auditory sense training device 1 is formed of two (left and right) channel systems, comprising a sound source 10, a band attenuation processing means 20 mounted corresponding to the left and right channels, a switching means 30 mounted corresponding to the left and right channels, a panpot processing means 40 to which the signals from the left and right channels are inputted, a phase reverse processing means 50 to which the signals from the left and right channels are inputted, a voice amplification means 60 mounted corresponding to the left and right channels, a voice output means 70 mounted corresponding to the left and right channels, a control means 80, a random time generation means 85 and a record playback means 90.

The sound source 10 may utilize a reproduced sound from a recording medium such as a CD, a MD, a magnetic recording medium or a semiconductor memory and the like, a synthetic sound from a synthesizer, or a natural sound from a microphone and the like, and its contents could be either an optional sound source from music, natural sound, sampling sound, synthetic sound, sound generated by dropping the electric wave to an audible tone band, a pulse-like sound, or a spoken language gained from a language learning CD and the like. Further, the sound source 10 is not limited to one, but rather, could be more than two sound sources. In this case, one original sound from one sound source may be used as the original sound without performing any processes, and the original sound from the other sound source could be selectively outputted as the processed sound gained by processing the original sound. The original sound from the sound source 10 is outputted to one input of the switching means 30 and the band attenuation processing means 20.

The band attenuation processing means 20 is a means for performing the attenuation process for a predetermined time and quantity against the specific frequency area of the original sound inputted thereto, which is controlled by the control means 80.

The band attenuation processing means 20 performs the region attenuation process to each of the left and right channels by independent patterns.

The region attenuation processed sound outputted from the band attenuation processing means 20 is outputted to the other input of the switching means 30.

The switching means 30 is controlled by the control means 80, and selects either the original sound from the sound source 10 or the region attenuation processed sound from the band attenuation processing means 20 for output to the panpot processing means 40.

The panpot processing means 40 is controlled by the control means 80, and performs a predetermined distribution process against either the original sound from the left and right channels or the region attenuation processed sound inputted from the switching means 30, which is then intersected and outputted to the left and right channels. The panpot processed sound is outputted to the phase reverse processing means 50.

The phase reverse processing means 50 is controlled by the control means 80, and performs a phase reverse process against either the left or right channels of the panpot processed sound from the panpot processing means 40. The output of the phase reverse means 50 is amplified to a desired volume by the voice amplification means 60, and outputted from the voice output means 70 of a speaker or a headphone and the like. Further, the output of the phase reverse means 50 is outputted to the record playback means 90, and may be recorded to the recording medium 95.

The control means 80 is a means for controlling the whole system of the auditory sense training device 1, and based on the timing from the random time generation means 85, performs the control of the region attenuation process of the band attenuation processing means 20, the selective control of the switching means 30, the panpot processing control of the panpot processing means 40, or the phase reverse process control of the phase reverse processing means 50 and the like.

Figure 5:
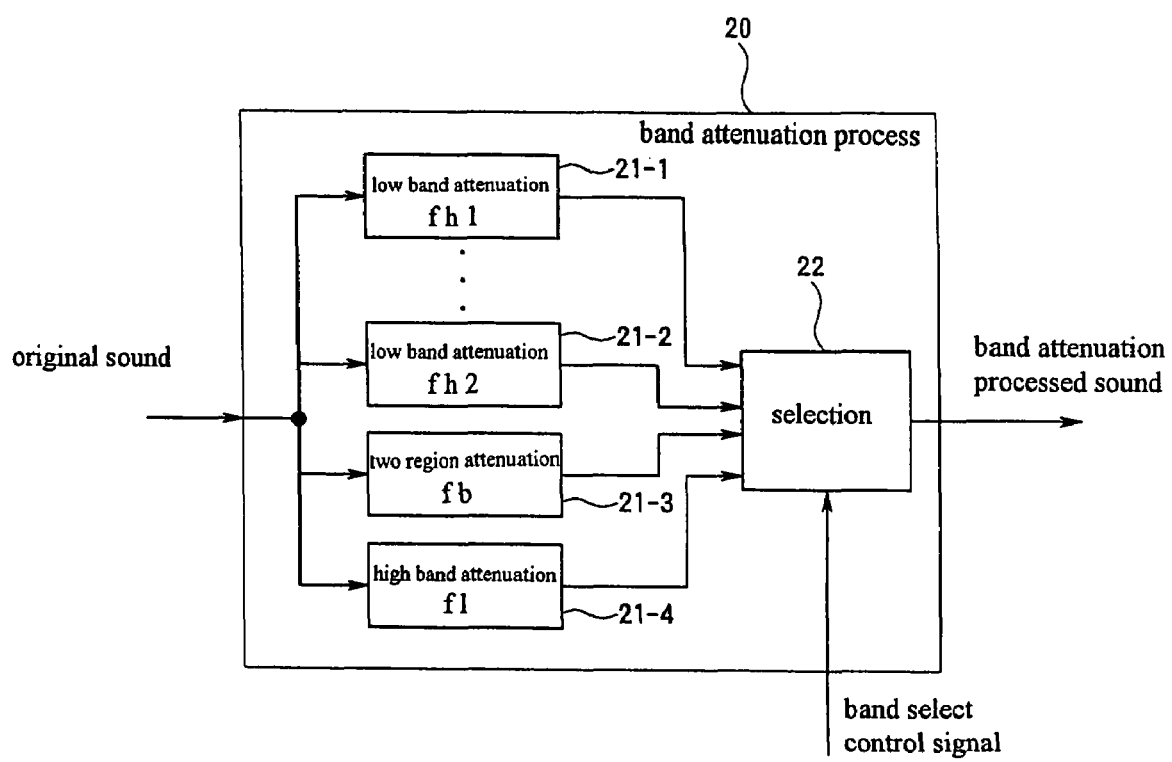
FIG. 5 is a block diagram showing the structure of the band attenuation processing means.

FIG. 5 is used to explain an example of the structure of the band attenuation processing means 20.

The band attenuation processing means 20 comprise a plurality of region attenuation means 21-1 to 21-4, and a selecting means 22 for selecting and outputting the output of said region attenuation means.

The region attenuation means 21 comprises a plurality of low band attenuation means 21-1 to 21-2, a plurality of two region attenuation means 21-3, and a plurality of high band attenuation means 21-4.

The low band attenuation means 21-1 and 21-2 are formed for example by a combination of a plurality of high-pass filters, and works to attenuate the band under a processing frequency f1. The low band attenuation means 21-1 and 21-2 should preferably hold a pattern for attenuating −10 dB from the processing frequency f1 to a predetermined frequency f1' (for example, a frequency gained by multiplying 0.65 to the processing frequency f1: f1'=0.65f1) and attenuating −20 dB below said predetermined frequency f1', or a pattern for optionally varying the attenuation level from 0 dB to −20 dB from the processing frequency f1 to the predetermined frequency f1'.

The processing frequency should preferably be set in units of 500 Hz, and in the range between 1800 Hz and 6000 Hz.

The two region attenuation means 21-3 is formed by combining a high-pass filter and a low-pass filter, and works to pass only the signal of a predetermined frequency band, and attenuate the high frequency region and the low frequency region.

The high band attenuation means 21-4 is formed for example by a low-pass filter, and works to attenuate by a predetermined pattern the frequency region over the processing frequency fh.

The selecting means 22 selects either of the output from said each region attenuation means 21-1 through 21-4 or a combination of a plurality of outputs based on the band selection control signal from the control means 80, and outputs a region attenuation processed sound.

Figure 6:
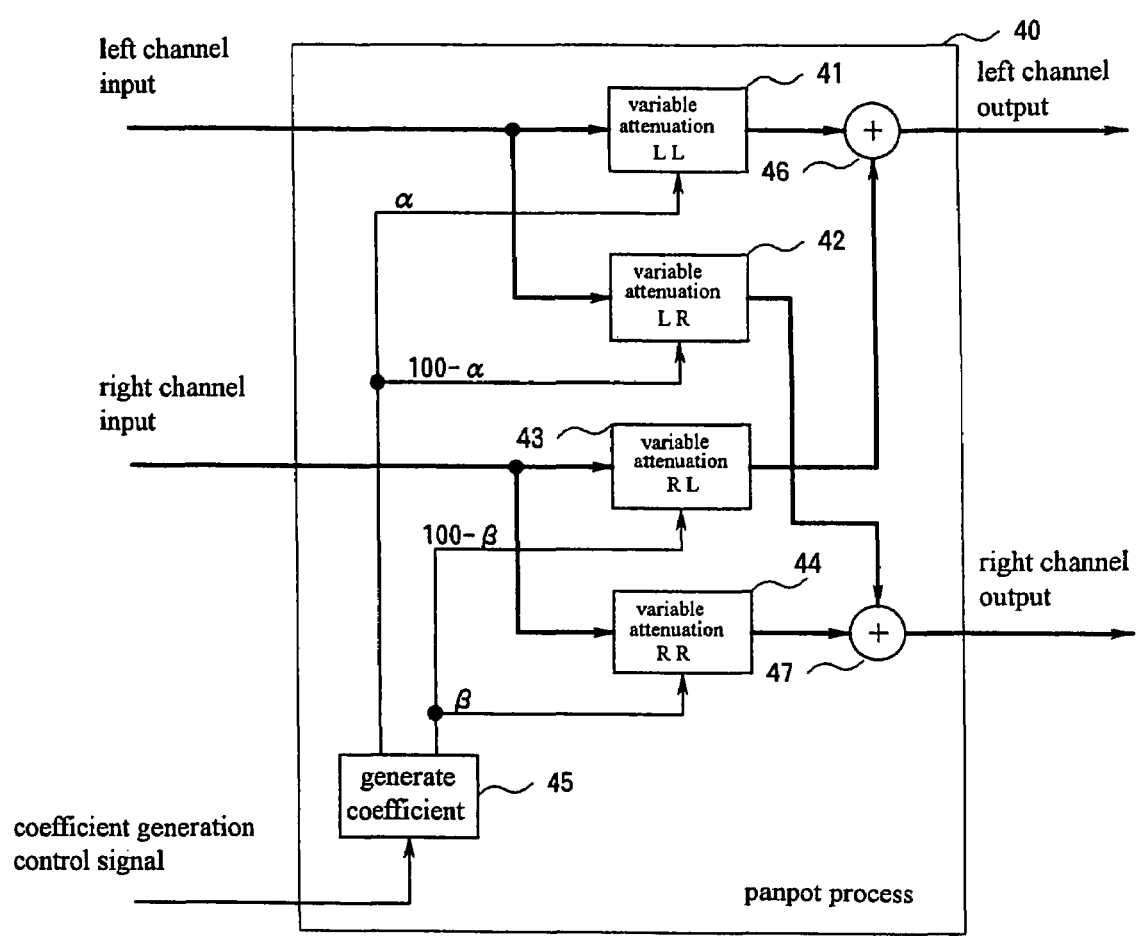
FIG. 6 is a block diagram showing the structure of the panpot processing means.

FIG. 6 is used to explain the example of the structure of the panpot processing means 40.

The panpot processing means 40 comprises of four variable attenuation means 41–44, a coefficient generation means 45, and two adding means 46 and 47.

Each variable attenuation means 41–44 is controlled of their attenuation quantity by the attenuation coefficient generated by a coefficient generation means 45. The attenuation coefficient of the variable attenuation means LL41 and the variable attenuation means LR42 is set so as to reach 100% when added together, and similarly, the attenuation coefficient of the variable attenuation means RL43 and the attenuation coefficient of the variable attenuation means RR44 is set so as to reach 100% when added together.

The left channel input is inputted to the variable attenuation means LL41 and LR42. The right channel input is inputted to the variable attenuation means RL43 and RR44.

The output of the variable attenuation means LL41 and RL43 are outputted to the adding means 46 as a panpot processed left channel output, and the output of the variable attenuation means LR42 and RR44 are outputted to the adding means 47 as a panpot processed right channel output.

The coefficient generation means 45 outputs the attenuation coefficient to each variable attenuation means 41–44 so as to form a predetermined panpot processing pattern with random time intervals, based on the coefficient generation control signal outputted from the control means 80.

Figure 7:
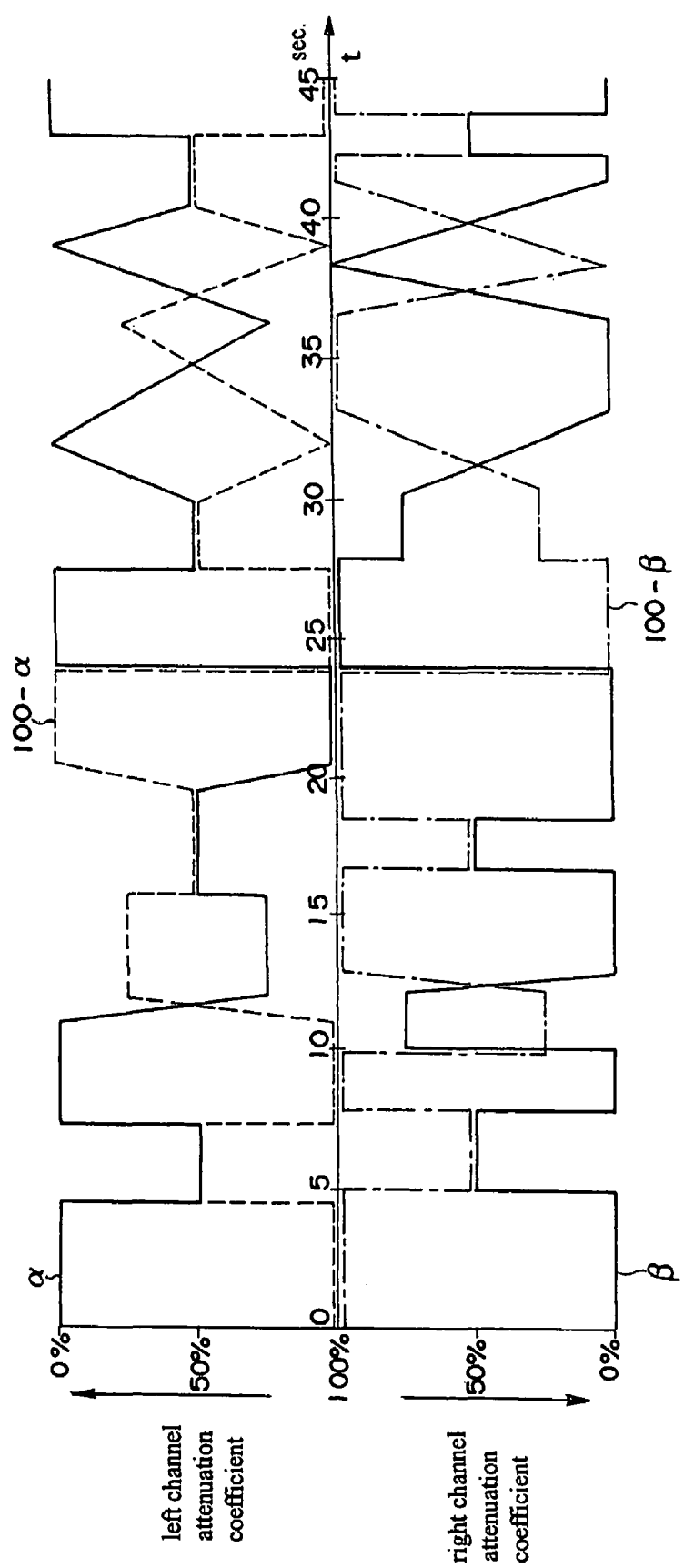
FIG. 7 is an explanatory view showing the actual example of the panpot process.

The example of the pattern of attenuation coefficients generated by the coefficient generation means 45 are shown in FIG. 7.

The attenuation coefficient to the variable attenuation means LL41 to which the left channel signal is inputted is shown by $\alpha$, and the attenuation coefficient to the variable attenuation means LR42 is shown by $100-\alpha$. The attenuation coefficient to the variable attenuation means RL43 to which the right channel signal is inputted is shown by $100-\beta$, and the attenuation coefficient to the variable attenuation means RR44 is shown by $\beta$.

As shown, the attenuation coefficient is randomly varied, the size or form of variation also shown randomly. Moreover, the generation pattern of the attenuation coefficient is varied for the right channel and the left channel.

Figure 8:
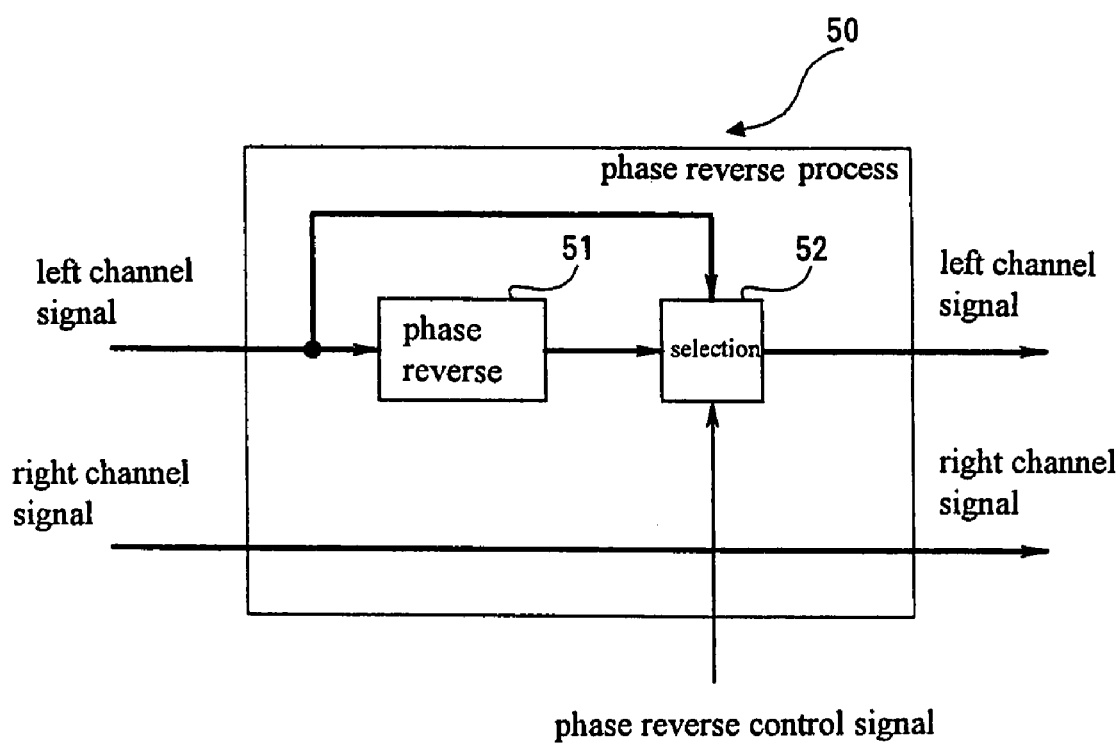
FIG. 8 is a block diagram showing the structure of the phase reverse processing device.

FIG. 8 is used to explain an example of the structure of the phase reverse processing means 50.

The phase reverse processing means 50 is formed of a phase reverse means 51 for reversing the phase of the input signal, and a selecting means 52 for selecting and outputting one input out of the two inputs. The phase reverse process should be performed to either one of the input from the right channel or the input from the left channel.

For example, the left channel signal is inputted to one of the inputs of the phase reverse means 51 and the selecting means 52, while the right channel signal is outputted in the original state where no phase reverse process is performed.

A signal performed of the phase reverse process by the phase reverse means 51 and a signal performed of no phase reverse process which is not changed from when it entered the phase reverse processing means 50 are inputted to the selecting means 52, and based on the phase reverse control signal from the control means 80, selects and outputs either one of the input signals.

The operation of the present auditory sense training device is explained in the following.

The original sound inputted from the sound source 10 is performed of the region attenuation process of a predetermined timing and pattern at the band attenuation processing means 20 for each of the left and right channels based on the band selection control signal, thereby forming the region attenuation processed signal, and outputted to one input terminal of the switching means 30. Further, the original sound inputted from the sound source 10 is inputted to the other input terminal of the switching means 30.

The switching means 30 selects either of the input signals based on the region attenuation processing pattern, and outputs the same to the panpot processing means 40.

The panpot processing means 40 performs a panpot process against the input signal by a predetermined timing and pattern based on the coefficient generation control signal, and outputs the same as a panpot processed signal to the phase reverse processing means 50.

The phase reverse processing means 50 performs a phase reverse process against the signal from the panpot processing means 40 by a predetermined timing based on the phase reverse control signal, and outputs the same to the voice amplification means 60.

The voice amplification means 60 amplifies the signal from the phase reverse processing means 50, and outputs the voice signal from the voice output means 70 of a speaker and the like.

The voice signal is then converted to a sound signal at the voice output means 70 and outputted as voice.

The order of the region attenuation process, the panpot process and the phase reverse process disclosed in the above explanation is not restricted to such, but could be of any order. Further, it may only comprise one or more of the above-mentioned processes.

The above description showed a method to perform the auditory sense training only by use of a processed sound.

However, by combining the processed sound with images, the auditory sense could be trained more effectively.

Moreover, the auditory sense could also be trained by playing back with an ordinary reproduction device the recording medium recording the sound performed of the auditory sense training sound processing method according to the present invention.

As explained above, by using the processed sound gained by the voice processing method for improving auditory sense according to the present invention, the sensibility of the Japanese speaker against sound could be removed. That is, by making the trainee listen to a region attenuation processed signal formed by treating an original sound of music or voice with a region attenuation process, the practice formed corresponding to the characteristic of the Japanese language of unconsciously strengthening the vowel in a sound or unconsciously deleting the consonant in a sound, or to anticipate a reverberation which does not exist, could be removed, and the effect in learning a language could be improved.

Moreover, even when learning music, the trainee may listen to music without being influenced by the Japanese sensibility formed by the characteristics of the Japanese language, and even when playing an instrument, the trainee may play without being influenced by the Japanese sensibility.

Further, the auditory sense training device for performing said voice processing for improving auditory sense is capable of providing a processed sound suitable for application to the above mentioned method, so it could be utilized in language learning and music learning.

By recording the processed sound gained by the voice processing method to a recording medium, the auditory sense could be trained by playing back the processed sound from the recording medium by use of a reproduction device.

What is claimed is:

1. An auditory sense training method for training an auditory sense of a trainee during a training session, the method comprising:

processing an original sound by attenuating a predetermined frequency region of said original sound so as to form a region attenuation processed sound;

having the trainee listen to said region attenuation processed sound; and alternating the trainee listening to said region attenuation processed sound and at least one of silence and said original sound during the training session;

wherein the predetermined frequency region of said original sound is either a first region under a predetermined frequency in a range between 1800 Hz and 7000 Hz, a second region over a predetermined frequency in a range between 2000 Hz and 7000 Hz, or a third region which is a combination of said first region and said second region and wherein said region attenuation processed sound is formed by processing either one of or a combination of said first, second and third regions.

2. The auditory sense training method according to claim 1, wherein said predetermined frequency region changes randomly among a plurality of various frequencies.

3. The auditory sense training method according to claim 1, wherein a time of alternating said region attenuation processed sound changes randomly.

4. The auditory sense training method according to claim 1, wherein said region attenuation processed sound has a duration between 0.1 seconds and 7 seconds.

* * * * *